Patented Dec. 5, 1933

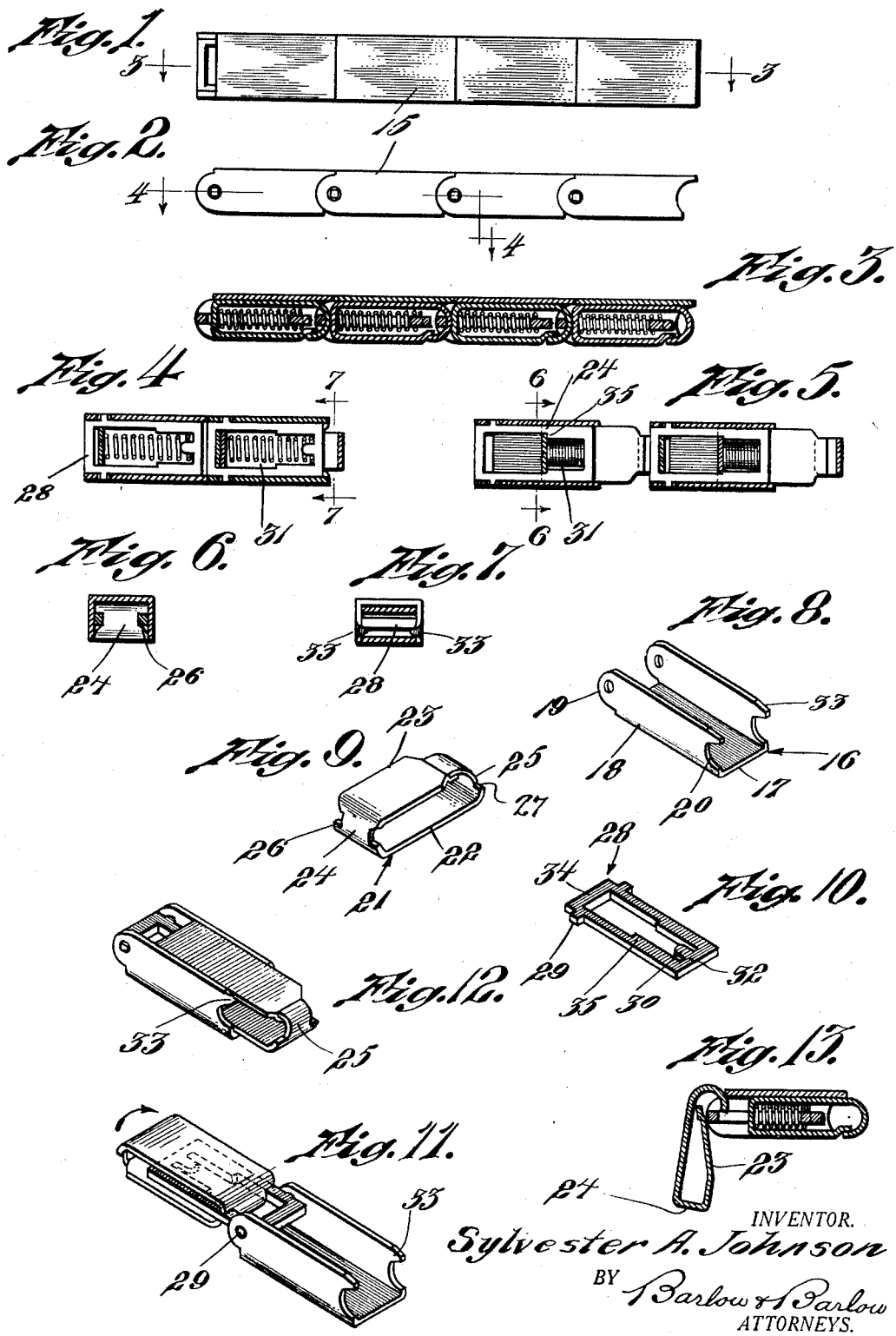

1,937,700

UNITED STATES PATENT OFFICE 1,937,700

ELASTIC BRACELET CHAIN

Sylvester A. Johnson, North Providence, R. I., assignor to Albert E. R. Speidel, Edgewood, R. I.

Application April 27, 1931. Serial No. 533,137

6 Claims. (Cl. 63—5)

This invention is a continuation in part of my co-pending application Serial No. 514,721, filed February 10, 1931 and relates to a bracelet chain which is elastically extendible, and has for its object to provide a series of units which may be quickly assembled from a plurality of like parts and yet be strong and durable and firmly held together.

Another object of the invention is the provision of a series of units each having two relatively slidable links which will be guided in their sliding action one relative to another during their relative movement.

Another object of the invention is the provision of a construction by which each of the units may be easily detachably connected one to the other by manual manipulation of the links.

Another object of the invention is the provision of a construction which will be flexible one link upon the other without extending the sliding parts against the action of the resilient spring which tends to contract the links, thereby eliminating all obstruction to such flexing movement.

Another object of the invention is to provide a construction which may be exceedingly narrow and yet one which will function effectively to maintain a watch or the like snugly about the wrist of the wearer.

A further object of the invention is to provide a stop to limit the extension of each unit and prevent the spring from being crushed or weakened especially when tightly stretched for plating.

A still further object of the invention is to position the cross bar of the unit at the extremity of the link for reception of the hook of the slide portion of the next link.

With these and other objects and advantageous features in view, the invention consists of a novel arrangement of parts more fully disclosed in the detailed description following, in conjunction with the accompanying drawing, and more particularly set forth in the appended claims.

In the drawing:

Fig. 1 is a top plan view of the chain;

Fig. 2 is a side elevation thereof;

Fig. 3 is a section on line 3—3 of Fig. 1;

Fig. 4 is a section on substantially the line 4—4 of Figure 2;

Fig. 5 is a view similar to Fig. 4 with each of the units in extended position;

Fig. 6 is a central sectional view through one of the units showing substantially on line 6—6 of Fig. 5 the guiding action of the bearing surfaces of the slide link on the yoke or frame member;

Fig. 7 is a section through the extended portion of the slide link on line 7—7 of Fig. 4 and showing the fingers as holding the yoke in position;

Fig. 8 is a perspective view of the outer guide link;

Fig. 9 is a perspective view of the inner band-shaped slide link;

Fig. 10 is a perspective view of the yoke member for connecting the guide and slide links of each unit;

Fig. 11 is a perspective view of a guide link and a slide link in the position just after the spring is inserted and before the slide link is moved to its assembled position in the guide link;

Fig. 12 is a perspective view after the slide link is moved to complete the assembled position with the securing fingers bent to hold the frame or yoke member in position;

Fig. 13 is a central sectional view showing the slide of one unit in position for detachment from the next unit.

In the construction of elastically extendible bracelets, a number of parts are used which must be assembled, and in the type of bracelet which is used with the baguette watch, the bracelet is of a width not greater than one-eighth of an inch, thus necessitating making the parts exceedingly small to handle in assembling; and in order that the spring which is difficult to handle because of its resilience, may be assembled in the unit with maximum ease, I have used a yoke or frame member for connecting the links and pivoted it in the guide link so that it and the slide link may be swung completely out of the guide link to permit the slide link to be moved sideways relative to the yoke member, and a spring inserted therein after which the guide link and yoke with the spring inserted may be swung to a position between the walls of the guide link where it may be easily secured in position by folding inwardly the fingers or upsetting any part of the stock thereover to prevent accidental swinging of these parts after assembly, I have utilized the frame member which permits easy assembly as a guide to assist in the guiding action of the slide link with reference to the guide link; and further I have provided stops on this frame link to prevent the relatively slidable parts from compressing the spring to its limit so that the springs of the units when the units are under tension for plating such as with chromium they will not be distorted or weakened; and the following is a detailed description of the present embodiment of this invention, illustrating the preferred means by which these advantageous results may be accomplished.

With reference to the drawing, 15 designates the units which are connected together in series, each unit of which comprises a guide link designated 16 and provided with a top wall 17, side walls 18 with pivot ears 19 at one end and arcuately shaped recesses 20 at the opposite end to receive these ears to permit free flexing action of the units one with reference to the other.

The slide link is designated 21 and is a generally band-shaped strip having a top wall 22, bottom wall 23 and connecting end wall 24 with a hook 25 provided on the opposite end of the top wall 22 which is closed by the bottom wall 23 which acts as a tongue. The end wall and hook are each cut away abruptly to provide a bearing surface 26 at one end and 27 at the other end to assist in guiding the slide link along the yoke designated generally 28.

This yoke 28 is generally of frame shape and has trunnion portions 29 positioned inwardly from its end and pivotally mounted in the openings in the ears 19 in the guide link, the same being slidably received in the slide link 21 and provided with a finger 30 to extend into and assist in positioning the spring 31 mounted between the end wall 24 of the slide link and the end cross bar 32 of the yoke.

In assembly, the yoke and guide link are in the relative positions illustrated in Figure 11, and the slide link 21 is swung sideways relative to the yoke. When in this position, the spring may be readily inserted and the slide link returned to the position illustrated in Figure 11, after which both the slide link and yoke are swung about the pivot trunnions 29 to position the parts, as illustrated in Figure 12 and to hold these parts in this position.

Fingers 33 are folded across the end 32 of the frame or yoke member, as illustrated in Fig. 12 to prevent the yoke from swinging relative to the guide link after assembled. The top wall 22 of the slide link is guided along the inner surface of the top wall 17 of the guide link while the bearing surfaces 26 and 27 just below the top wall 22 engage one side of the yoke or frame member to slide therealong and be guided thereby, while the edges of the wall 22 are guided between the side walls 18 of the guide link during the sliding movement thereof.

The hook 25 of the slide link may be opened by the bottom wall or tongue 23 so that it may be attached to the cross bar 34 of the yoke or frame link for detachable connection of the units one with the other as illustrated in Fig. 13. The tongue at its end is offset or provided with a step at its end to cause its outer surface adjacent the hook to lie flush with the hook.

The cross bar 34 of the yoke extends beyond the pivotal trunnions 29 flush with the ends of the connecting ears 19 and beyond the end of the top wall 17 of the guide link whereby it may readily receive the hook of the slide link of the next unit for detachably connecting the parts together. (See Fig. 13.)

In plating for instance chromium plating, in order to obtain a good plate the bracelet must be tightly pulled from its opposite ends to cause the parts to firmly contact. In so doing this spring might become crushed to prevent which I have formed stops 35 to engage the end wall 24 of the slide link and limit its movement as shown in Fig. 5 so that the spring will not be compressed to its limit upon extension to weaken its temper upon plating.

While I have described certain construction forms which embody the principles of my invention, it is obvious that other desired changes in arrangement may be made within the spirit and the scope of the invention as defined in the appended claims.

I claim:

1. An extension bracelet chain, comprising a series of units each comprising a guide link and a band-shaped slide link, a yoke member secured to said guide link inwardly from the end thereof to position the end bar of the yoke flush with the end of the guide link to facilitate attachment of the units and extending through said slide link, a spring acting between said yoke member and slide link tending to contact the links of each unit and stop means on said yoke for engaging said slidably related link and limiting said sliding relation to prevent binding the spring.

2. An extension bracelet chain, comprising a series of units each comprising a guide link and a band-shaped slide link, a yoke member secured to said guide link inwardly from the end thereof to position the end bar of the yoke flush with the end of the guide link to facilitate attachment of the units and extending through said slide link, a spring acting between said yoke member and slide link tending to contract the links of each unit, said yoke member having stop portions intermediate its ends to engage the folded portion of the band link and limit its extension prior to binding the spring.

3. An extension bracelet chain, comprising a series of units, each comprising a guide link and a band-shaped slide link, a yoke member, trunnions positioned inwardly from the end thereof for pivotally securing the yoke member to one end of said guide link and extending through said slide link, said trunnions being positioned inwardly on the yoke member to position the end bar thereof flush with the end of the guide link to facilitate attachment of the units fingers at the other end of said guide link to hold the yoke member in place against swinging movement after assembled, and a spring acting between said yoke and slide link tending to contract the links of each unit.

4. A bracelet chain comprising a series of units, each comprising a guide link having top and side walls, a band-shaped slide link engaging said walls and guided thereby, a yoke member extending through the slide link, means inwardly from the end of said yoke member for pivoting said yoke member adjacent one end of the guide link, whereby said slide link may have a spring assembled in it between the slide link and yoke member in a position outside of the guide link and then swung on the pivot of the yoke member to a position between the side walls, said trunnions being positioned inwardly on the yoke member to position the end bar thereof flush with the end of the guide link to facilitate attachment of the units.

5. A bracelet chain comprising a series of units each having a guide link and a slide link, a yoke member having trunnions extending laterally therefrom into the guide link and spaced inwardly from the end thereof to position the end bar of the member flush with the end of the guide link.

6. A bracelet chain comprising a series of units detachably connected each having a guide link and a slide link, a yoke member having trunnions extending laterally therefrom into the guide link and spaced inwardly from the end thereof to position the end bar of the member flush with the end of the guide link to facilitate hooking engagement with the next unit, said slide link having a hook to engage the end bar of the next unit to detachably connect the units together.

SYLVESTER A. JOHNSON.